United States Patent Office 2,719,031
Patented Sept. 27, 1955

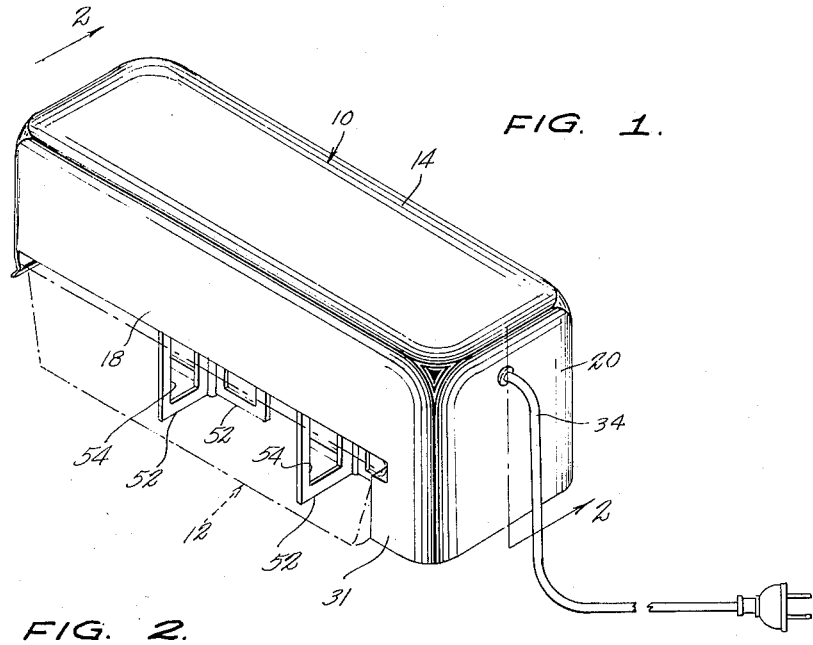

2,719,031

AGITATING DEVICE FOR MAKING ICE CREAM AND THE LIKE

Joseph W. Morgan, Montgomery, Ala.

Application August 28, 1953, Serial No. 377,181

1 Claim. (Cl. 259—119)

This invention relates to an agitating, mixing, or whipping device specifically designed for detachable connection to a conventional refrigerator ice cube tray, the device constituting the present invention being provided with agitating means depending within the tray to which the device is connected, for the purpose of whipping a cream like substance disposed within said tray.

An important object of the present invention is to provide a device of the type stated which will be so designed as to permit said device to be readily connected to any of various conventional refrigerator trays in which ice cubes are ordinarily made, this particular feature of the invention having the desirable characteristic whereby the device can be sold separately from an associated container in which the ice cream is to be made.

Another object of importance is to provide a device of the nature referred to which will be so shaped as to fit compactly about the tray associated therewith, thus to allow the device to be disposed with the tray connected thereto within the tray receiving space of a refrigerator, without requiring modification or redesign either of the tray or of the refrigerator in which it is used.

Another object of importance is to provide a device as stated wherein the detachable connecting means used for attaching the device to the tray will be so designed as to be readily engageable with the peripheral bead of an ice cube tray, at opposite ends of the tray.

Still another object is to provide, in an agitating device for making ice cream in refrigerator ice cube trays, agitator or blade assemblies adapted to be spaced longitudinally of the tray in which the ice cream is made, at locations found particularly effective in producing a uniformly whipped substance throughout the tray, the agitator means depending within the tray comprising blade assemblies each of which includes equidistantly and circumferentially spaced radially and outwardly extending blades having large rectangular openings through which the cream like substance will flow during use of the device.

Another object of importance is to provide an agitating device as stated in which the housing of the device will be so proportioned as to completely cover a conventional rectangular tray, while not projecting beyond the opposite sides of the tray or beyond one end of the tray to any appreciable extent.

Still another object is to provide a device of the nature referred to which will include an electric motor, located within a depending housing extension provided at one end of the agitating device, the particular formation and relative arrangement of the housing extension being such as to prevent the motor from forming too high a projection above the tray. In this way, it is proposed to facilitate the insertion of the agitating device and its associated tray within a conventional tray receiving chamber of an electric refrigerator.

Another object of importance is to provide an agitating device of the nature referred to wherein the means for detachably connecting the same to the tray will include a transversely extending recess pressed out of the material of the housing, with said recess being adapted to receive the peripheral bead at one end of a tray, the connecting means including, at the opposite end of the tray, a spring clip formed integrally of the sheet material from which the motor and shaft housing of the agitating device is formed.

A further object of importance is to provide a geared connection between the motor shaft and the agitator blade shafts, which geared connection can be so designed so as to facilitate a speed reduction between the shafts, thereby to cause the blade shafts to rotate at a speed found particularly suitable in the making of ice cream or like cream like substances.

Other objects will appear from the following description, the claim appended thereto, and from the annexed drawing, in which like reference characters designate like parts throughout the several views, and wherein:

Figure 1 is a perspective view, the dotted lines indicating a conventional ice cube tray to which the device is applied; and Figure 2 is an enlarged longitudinal sectional view, the tray again being shown in dotted outline.

The reference numeral 10 has been applied generally in the drawing to designate the invention, the invention being shown as it appears when applied to a conventional ice cube tray designated generally by the reference numeral 12.

The agitating device 10 includes a relatively elongated, rectangular, hollow housing for a motor and for a motor shaft, the housing being so proportioned as to roof over the ice cube tray 12 when the housing is positioned upon the tray in the manner shown in Figures 1 and 2. In this connection, the housing can be formed from sheet metal material throughout, and as shown in Figure 2, one piece of sheet metal material can be pressed to shape, with an end wall 16, a rectangular top wall integral with said end wall, and vertically depending side walls 18 integral both with the top wall and with said end wall 16. The side walls 18, at that end of the housing remote from the end wall 16, merge into an end wall 20, and as will be noted from Figure 2, the end wall 20 depends from the top wall of the housing a substantially greater distance than does the end wall 16.

At its lower end, the end wall 20 merges into a horizontally disposed housing extension bottom wall 22, and this in turn merges into a vertically ascending inner housing extension wall 24. The wall 24 is integrally formed with an offset part 26 defining a transverse recess in the housing, said transverse recess opening at opposite sides of the housing to facilitate engagement of the peripheral bead of an ice cube tray in the recess.

The housing extension wall 24, at the location of the recess 26, merges into a bottom wall 28 of the housing, said bottom wall 28 being integral with a transverse partition 30 disposed vertically within the housing intermediate the opposite ends thereof, but closer to the wall 20 than to the wall 16.

Within the housing I provide an electric motor 32. This is of conventional design, and is disposed within the housing extension previously referred to herein. The housing extension, it will be noted, depends from the housing at one end thereof, beyond the adjacent end of the ice cube tray 12. The purpose of this arrangement is to permit use of a motor 32 of sufficient size, while at the same time locating the motor in a space in which it will not interfere with insertion of the tray and the agitating device in the tray chamber of a conventional electrical refrigerator.

The motor 32 is powered through a cord 34, extending exteriorly of the housing and provided with a conventional electric plug whereby the cord can be connected with a conventional house circuit.

Extending from the motor 32, and arranged longitudinally and centrally of the housing, is a motor shaft 36 and a shaft coupling 38 is secured to said shaft 36 and to an extension motor shaft 40. The shaft 40, at one end, is journaled in a bearing 42 carried by the partition 30, and at its other end is journaled in a bearing 44 carried by the end wall 16.

Secured to the shaft 40, at selected locations taken longitudinally thereof, are bevel gears 46, and meshing with said gears 46 are bevel gears 48. The gears 48 are secured to the upper ends of blade shafts 50, said blade shafts 50 projecting exteriorly of the housing, as best shown in Figure 2.

Secured to the depending, projecting ends of the shafts 50 are agitator blade assemblies, with each assembly including a plurality of agitator blades 52. Each blade 52 is of rectangular formation, and has a large, rectangular opening 54 formed therein. The blades 52 of each assembly are spaced equal distances apart about the associated blade shafts 50, and are secured fixedly to said blade shafts to rotate therewith, the several blades 52 of each assembly projecting radially and outwardly from their associated blade shafts.

The upper end portions of the blade shafts 50 are extended through a bottom plate 56 of the housing, said bottom plate 56 having longitudinally spaced bearing openings 58 in which the blade shafts 50 rotate. Integral with the bottom plate 56, and extending upwardly within the interior of the housing, are annular bosses 60 providing spacer means on which the gears 48 are supported for rotation.

In use of the device, it is merely necessary that the conventional ice cube tray 12 be removed from the tray chamber of the refrigerator, after which the ice cube divider is taken out of the tray. The housing of the agitating device, at that end thereof remote from the recess 26, has a spring clip 62 integrally formed with the end wall 16 of the housing, and said spring clip is adapted to resiliently yield in a direction away from the recess 26, to receive the adjacent peripheral bead of the ice cube tray. It will be understood that previously, the peripheral bead at the other end of the ice cube tray will have been engaged in the recess 26. Once the recess 26 receives the adjacent portion of the tray bead, the end of the housing shown at the left in Figure 2 can be rocked downwardly, so as to cause the spring clip 62 to engage under the peripheral bead of the tray.

The device will now have been properly positioned relative to the tray, and will completely cover the same, to prevent loss of the cream like substance disposed within the tray, that is to be agitated for the purpose of making ice cream or a like food.

The tray 12 illustrated in the drawing is a conventional type of tray, known as a "double depth" tray, this particular tray being especially well fitted for association with the agitating device constituting the present invention.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

An agitating device for making ice cream and the like comprising a housing proportioned to form a cover for an ice cube tray on which the housing is positioned, said housing including a depending extension at one end thereof; means on the housing for detachably connecting the same to said tray, said means for connecting the housing to the tray including a spring clip at that end of the housing remote from said extension, said spring clip being yieldable to engage over a peripheral bead of an ice cube tray at one end of the tray, said means for connecting the housing to the tray further including a recess formed in the housing extension extending transversely of the housing and adapted to receive the peripheral bead at the other end of the tray; a motor within said housing extension; an elongated shaft secured to the shaft of the motor to rotate therewith, said elongated shaft being journaled in the housing and being arranged longitudinally of the housing; blade shafts journaled in the housing at right angles to said elongated shaft, said blade shafts being spaced longitudinally of the elongated shaft; gear means on the blade shafts and elongated shaft respectively in mesh for rotating the blade shafts responsive to rotation of the elongated shaft; and agitator blades fixedly secured to said blade shafts exteriorly of the housing, said agitator blades being extendable into a tray over which the housing is positioned with each blade shaft having equidistantly and circumferentially spaced agitator blades having large rectangular openings to facilitate agitation of a cream like substance within the tray.

References Cited in the file of this patent

UNITED STATES PATENTS

| | | |
|---|---|---|
| 297,518 | Hussey | Apr. 22, 1884 |
| 1,873,407 | Holland | Aug. 23, 1932 |
| 1,885,139 | Porter | Nov. 1, 1932 |